United States Patent [19]

Shellman

[11] 3,896,685

[45] July 29, 1975

[54] TRANSMISSION CONTROL FOR A TRANSMISSION HAVING ONE DRIVE ESTABLISHING DEVICE FOR TWO INDEPENDENT DRIVE FUNCTIONS

[75] Inventor: Carl E. Shellman, Livonia, Mich.

[73] Assignee: General Motors Corporation, Detroit, Mich.

[22] Filed: Sept. 12, 1973

[21] Appl. No.: 396,569

[52] U.S. Cl. .................. 74/867; 74/869; 74/DIG. 1
[51] Int. Cl.² .................... B60K 41/04; F16H 5/64
[58] Field of Search ......... 74/869, 868, 867, DIG. 1

[56] References Cited
UNITED STATES PATENTS

| | | |
|---|---|---|
| 2,896,478 | 7/1959 | Winchell ..................... 74/DIG. 1 |
| 3,308,676 | 3/1967 | Zundel et al ..................... 74/869 X |
| 3,505,906 | 4/1970 | Lemieux ........................... 74/869 X |
| 3,651,714 | 3/1972 | Ohya et al. .......................... 74/867 |

Primary Examiner—Samuel Scott
Assistant Examiner—John Reep
Attorney, Agent, or Firm—Donald F. Scherer

[57] ABSTRACT

A hydraulic control for a transmission wherein one drive establishing device, such as a brake, is engaged for independent drive ratios, such as low forward and reverse, at different pressure levels. A control valve is disposed between the manual control valve and the drive establishing device to admit full pressure during one drive ratio and reduced pressure during the other drive ratio.

1 Claim, 21 Drawing Figures

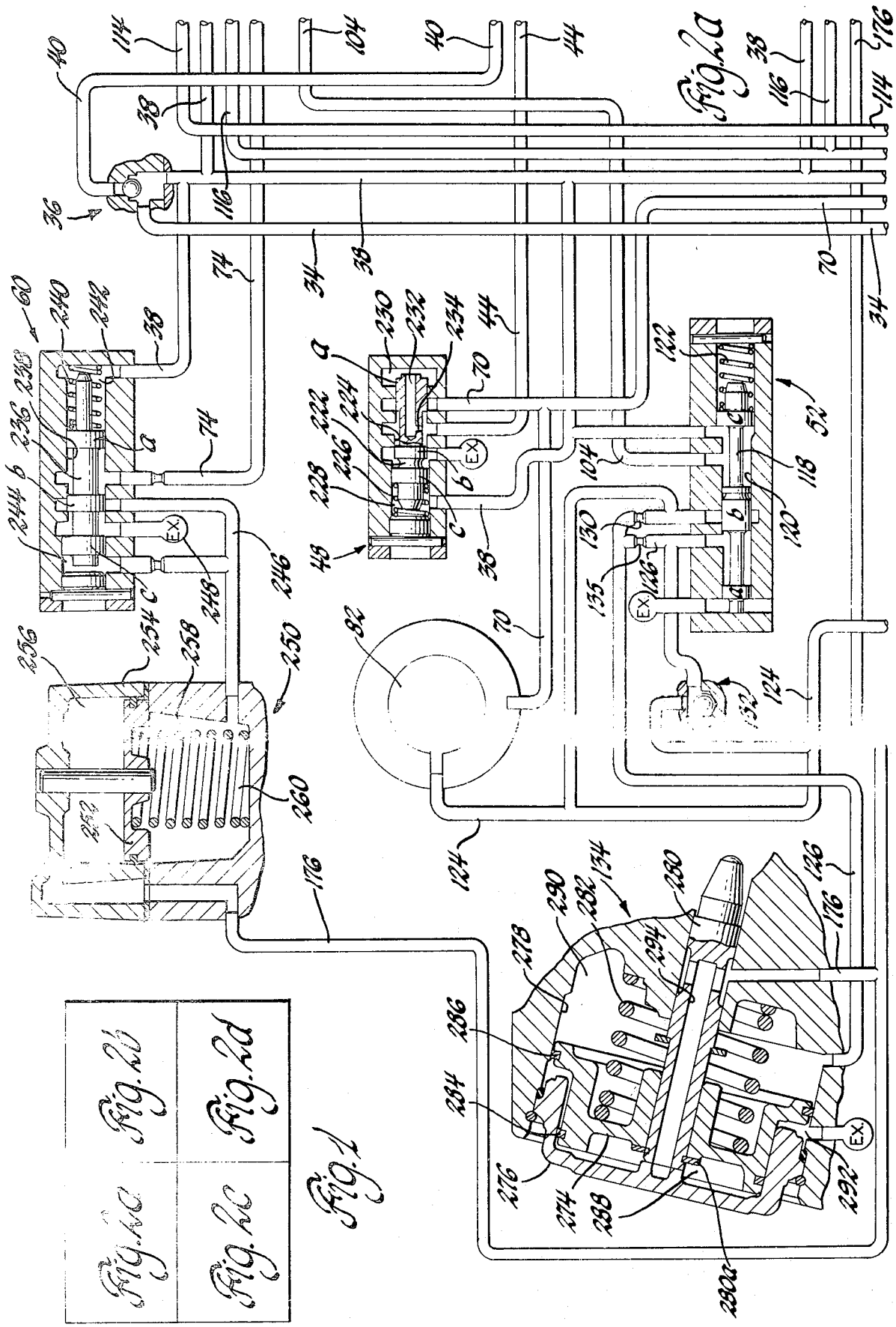

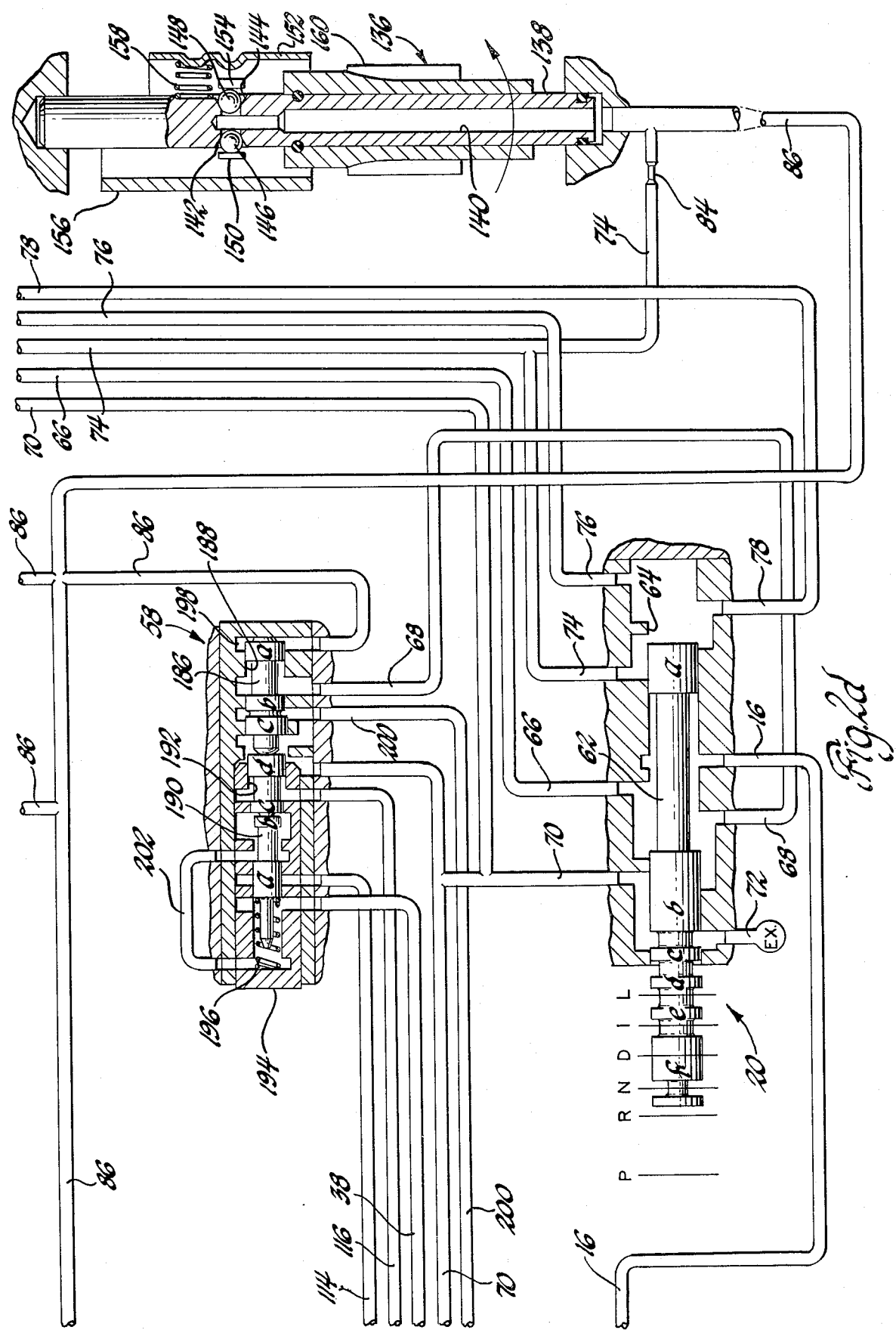

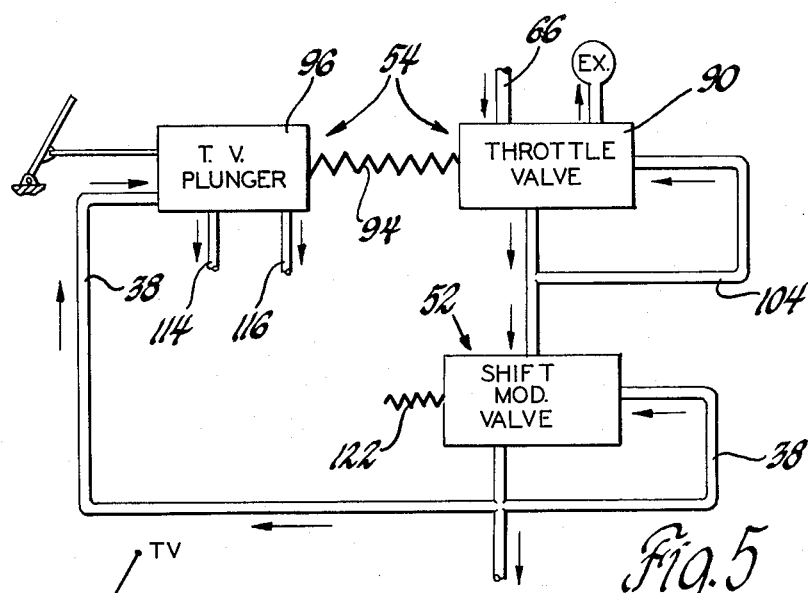
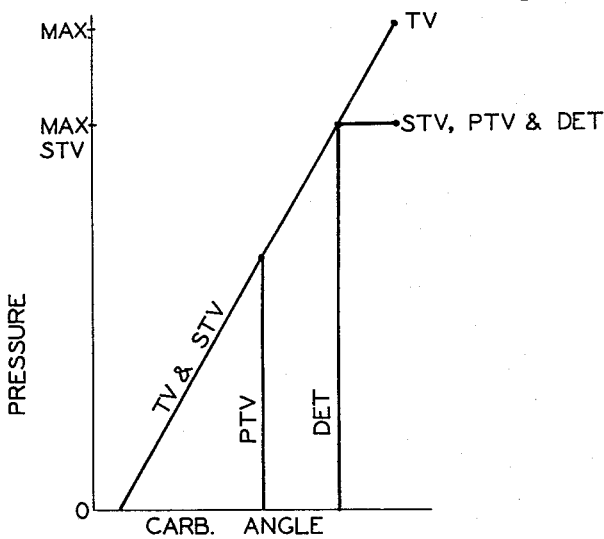
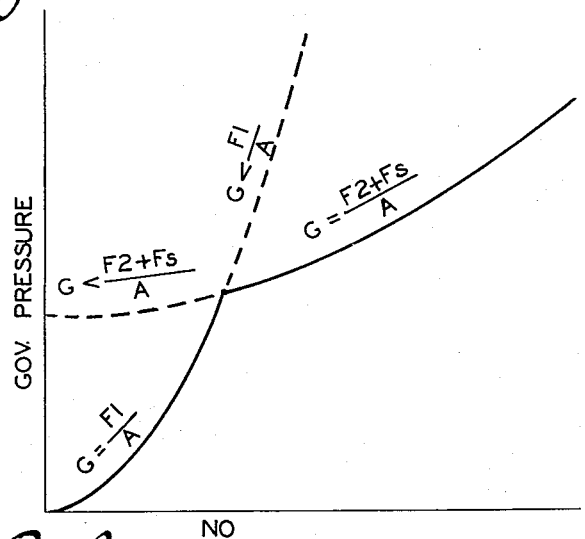
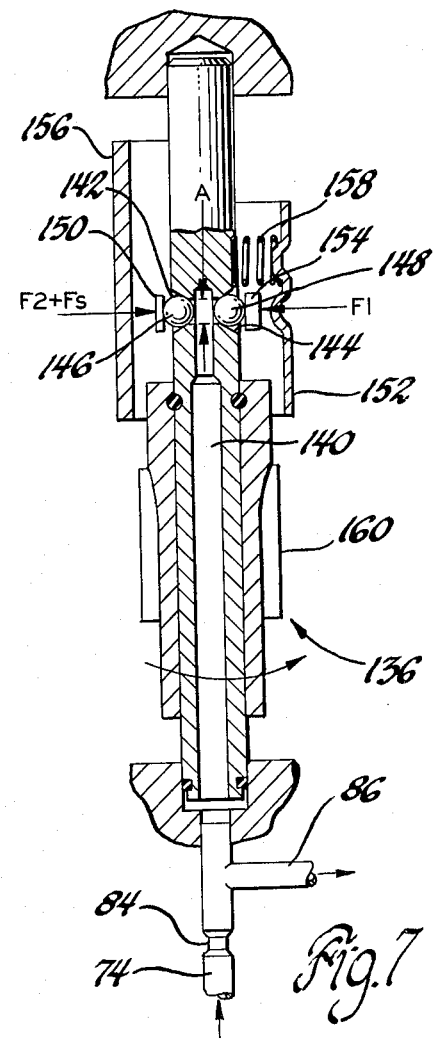
Fig. 5
Fig. 6
Fig. 7
Fig. 8

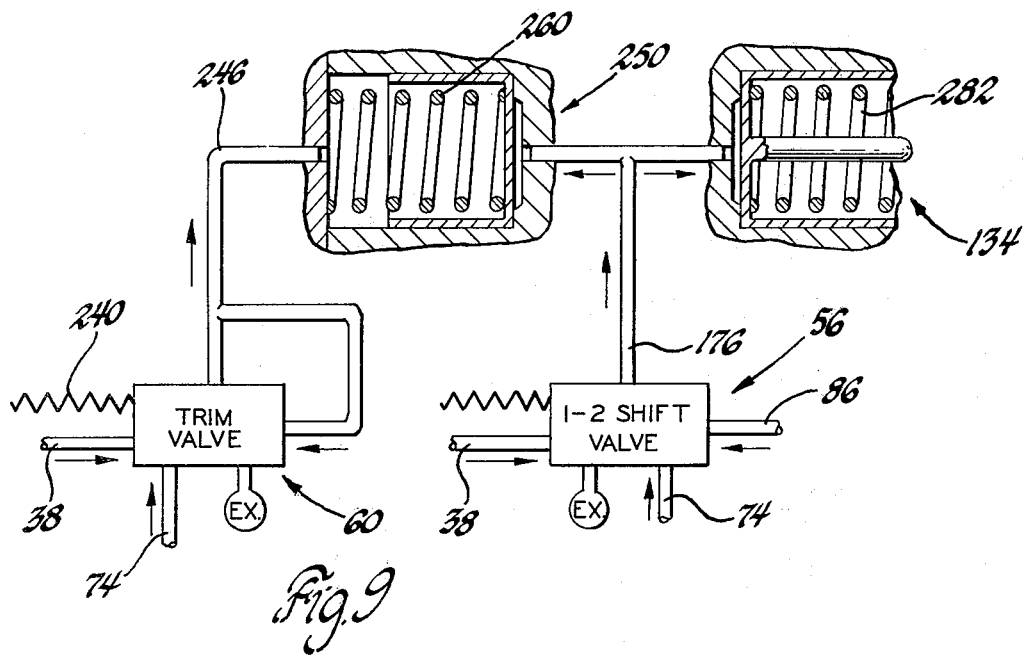
Fig. 9
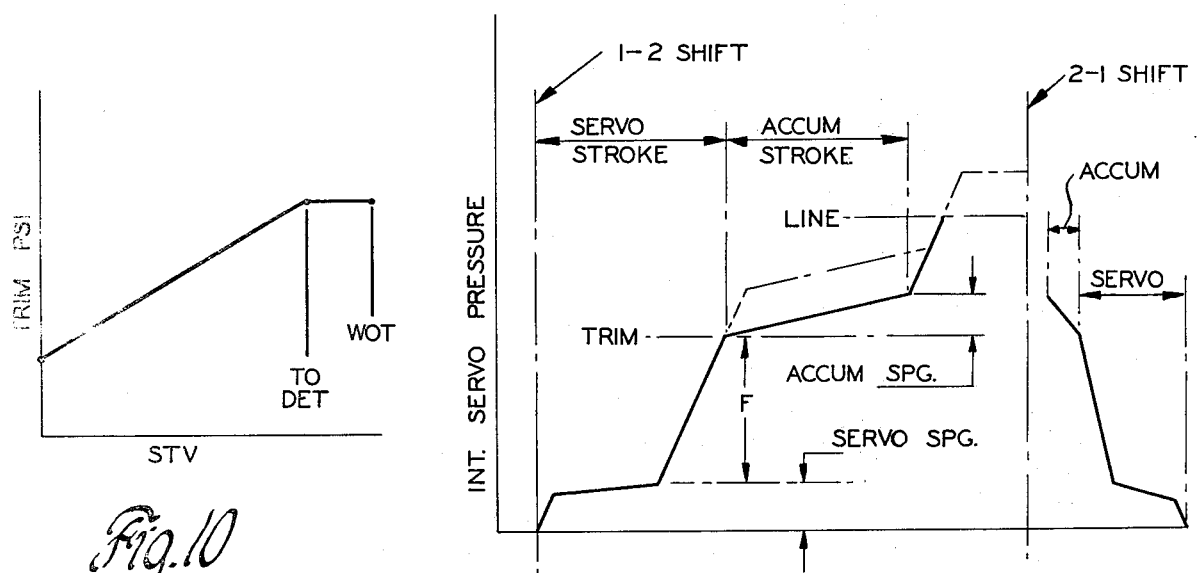
Fig. 10
Fig. 11

TRANSMISSION CONTROL FOR A TRANSMISSION HAVING ONE DRIVE ESTABLISHING DEVICE FOR TWO INDEPENDENT DRIVE FUNCTIONS

This invention relates to hydraulic transmission controls and more particularly to transmission controls having a control valve for controlling the engagement pressure of a single drive establishing device at separate levels for different drive ratios.

Prior art transmissions and controls, wherein a single servo operated drive establishing device is used to establish separate drive functions in the transmission, incorporate different areas on the engaging servo member such that different engagement forces can be used for the separate drive functions. This has been done particularly where a disc type brake is used to establish both the forward and reverse drive functions in a transmission. The engagement forces are generally considerably different in transmissions of this type, such that the reverse reaction is higher than the forward reaction. The cost of manufacturing such servo devices, such as pistons to be slidably disposed in a stepped chamber, is considerably reduced by using a single area piston.

The present invention permits the use of a single area piston by controlling the pressure levels which are used to engage the drive establishing device. For example in reverse operation, since high reaction is necessary, a high engagement pressure is used, and in the low forward drive range, where less reaction is necessary, a low engagement pressure is used. This is accomplished by incorporating a valve between the pressure source and the drive establishing device. The valve is operable in response to reverse operation to fully open the piston engagement area to transmission line pressure, and during low opration, is operable to direct a reduced pressure to the piston engagement area. Thus, permitting separate engagement forces for the different drive functions.

It is an object of this invention to provide in an improved hydraulic transmission control a valve member disposed between the pressure source and the drive establishing device to be engaged which valve directs full transmission line pressure to the drive establishing device during one drive operation and a reduced engagement pressure to the drive establishing device during another drive operation.

It is another object of this invention to provide in an improved transmission control having a manual valve for establishing a plurality of drive ratios, and a drive establishing device which is engaged for a plurality of drive conditions, a valve member disposed between manual valve and the drive establishing device wherein during one drive operation fluid pressure from the manual valve acts on one end of the control valve to fully open the control valve and admits transmission line pressure to the drive establishing device, and during another drive operation fluid pressure from the manual valve is directed to the differential area on the control valve to admit a reduced pressure to the drive establishing device.

These and other objects and advantages of this invention will be more apparent from the following description and drawings wherein:

FIG. 1 is a block diagram showing the arrangement of FIGS. 2a, 2b, 2c, and 2d;

FIGS. 2a, 2b, 2c, and 2d are combined as shown in FIG. 1 to illustrate the transmission control in diagrammatic form;

FIG. 5 is a schematic diagram of the throttle valve system;

FIG. 6 is a graph showing the pressure relationship of the throttle valve system;

FIG. 7 is a sectional elevational view of the governor;

FIG. 8 is a graph showing governor pressure relative to transmission output speed FIG. 9 is a schematic diagram of the valving of the 1–2 shift system;

FIG. 10 is a graph showing a pressure relationship found in the 1–2 shift system;

FIG. 11 is a graph showing the pressure versus time relationship for the 1–2 shift system;

Figure 2B:
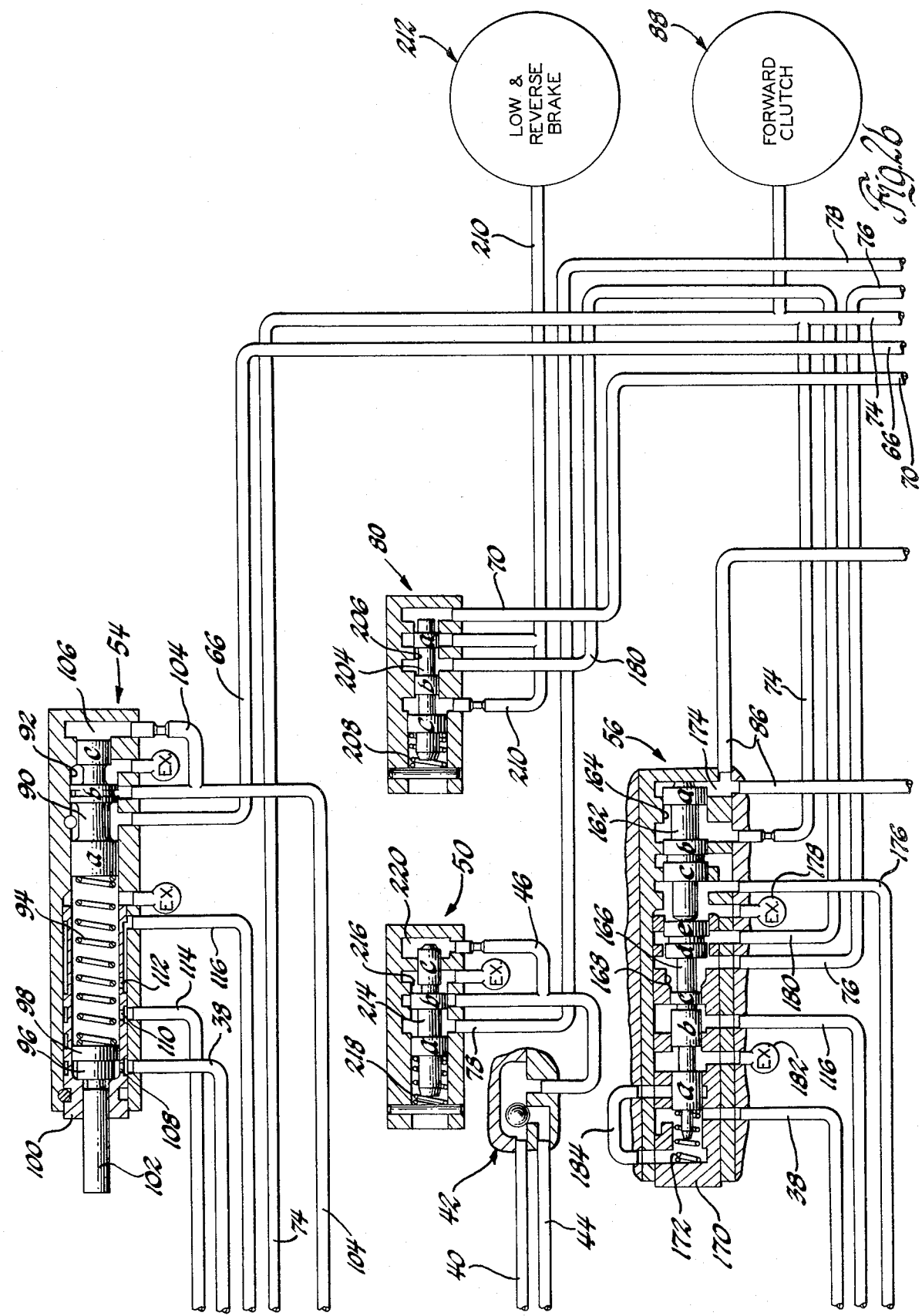
Figure 2C:
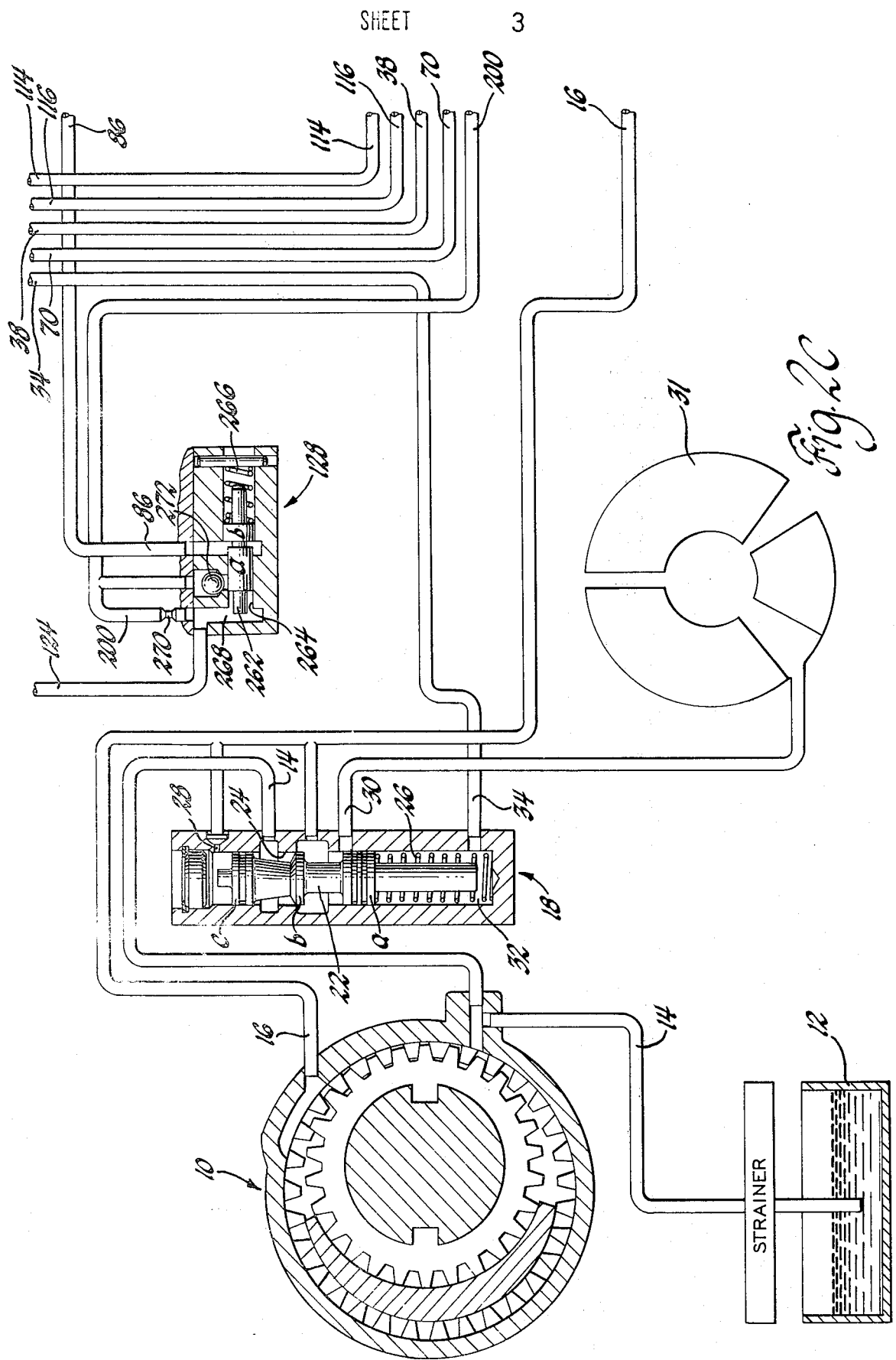

Referring to the drawings, there is shown a conventional fluid pump 10 which draws fluid from a reservoir 12 through a passage 14, and delivers the fluid to a main pressure passage 16. The main line 16 is in fluid communication with a pressure regulator valve 18 and a manual valve 20. The regulator valve 18 includes a valve spool 22 and an equal diameter spaced lands $a$, $b$, and $c$ slidably disposed in a valve bore 24 and a compression spring 26 compressed between valve land $a$ and one end of valve bore 24. The valve bore 24 is in fluid communication with main passage 16 intermediate lands $a$ and $b$ and through a restriction 28 intermediate the space between valve land $c$ and the end of valve bore 24. The valve bore 24 is also in fluid communication with the return passage 14 and a converter feed passage 30 which directs fluid to a conventional torque converter 31. During operation, line pressure in passage 16 acts on the end of valve land $c$ to move the valve spool 22 against the compression spring 26 at a predetermined pressure to move the valve spool 22 in the bore 24 thereby permitting progressive fluid communication between line passage 16 and converter feed passage 30 and the remaining excess fluid is then communicated from line passage 16 to the return passage 14. The predetermined pressure at which the regulator valve operates is determined by the compression spring 26 and fluid pressure in a chamber 32 formed by valve land $a$ and one end of valve bore 24. Fluid pressure is communicated to the chamber 32 through a line boost passage 34. The line boost passage 34 is in fluid communication with a shuttle valve 36 through which fluid pressure is communicated with the line boost passage 34 from either a shift TV passage 38 or a reverse-intermediate-low (RIL) passage 40. The RIL passage 40 is connected to a shuttle valve 42 through which fluid pressure is communicated to the RIL passage 40 from a reverse boost passage 44 or an intermediate boost passage 46. The reverse boost passage 44 is in fluid communication with a reverse boost valve 48 while the intermediate boost passage is in fluid communication with an intermediate boost valve 50. The shift TV passage 38 is in fluid communication with a shift modulator valve 52, the reverse boost valve 48, a throttle valve 54, a 1-2 shift valve 56, a 2-3 shift valve 58, and a trim valve 60.

MANUAL VALVE

The manual valve 20 includes a valve spool 62 having a plurality of equal diameter spaced lands $a$, $b$, $c$, $d$, $e$, and $f$ which are slidably disposed in a valve bore 64. The valve spool 62 is selectively movable to a plurality of positions including Park (P), Reverse (R), Neutral (N), Forward Drive (D), Intermediate (I), and Low (L). In the neutral position shown, the line passage 16 is in fluid communication with a reverse-neutral-drive-intermediate (RNDI) passage 66, a reverse-neutral-drive (RND) passage 68 between lands $a$ and $b$, while a reverse passage 70 is in fluid communication with an exhaust passage 72 between lands $b$ and $c$, and a drive passage 74, a low passage 76 and an intermediate passage 78 are communicated to exhaust at the end of the valve bore 64. When the valve spool 62 is moved to the R position, line pressure in passage 16 is communicated between lands a and b with passages 66, 68, and 70 while the remaining passages are connected to exhaust. In the D position, fluid pressure is communicated from main line passage 16 to passages 66, 68, and 74 intermediate lands $a$ and $b$ while the remaining passages are connected to exhaust. In the I position, fluid pressure from main line passage 16 is communicated between lands $a$ and $b$ to passages 66, 74, and 78 while the remaining passages are exhausted. In the L position, fluid pressure in main passage 16 is communicated between lands $a$ and $b$ to passages 74, 76, and 78 while the remaining passages are exhausted. In the P position, fluid pressure in the main passage 16 is blocked from the valve bore 64 by valve land a while the remaining passages in fluid communication with valve bore 64 are connected to exhaust.

The reverse passage 70 is in fluid communication with the reverse boost valve 48, the 2-3 shift valve 58, a low control valve 80, and a direct-reverse clutch 82. The RND passage 68 is in fluid communication with the 2-3 shift valve 58. The RNDI passage 66 is in fluid communication with the throttle valve 54. The drive passage 74 is in fluid communication through a restriction 84 with a governor passage 85, the 1-2 shift valve 56, a forward clutch 88, and the trim valve 60. The intermediate passage 78 is in fluid communication with the intermediate-low boost valve 50. The low passage 76 is in fluid communication with the 1-2 shift valve 56.

THROTTLE VALVE

The throttle valve 54 is a manually operated throttle valve having a valve spool 90 with equal diameter spaced lands a and b and a smaller diameter land c slidably disposed in a stepped valve bore 92. The compression spring 94 is disposed between valve land a of spool 90 and a manual control valve or plunger 96 which has a valve land 98 slidably disposed in a sleeve 100 which is secured in valve bore 92. The control valve 96 also has an extension 102 extending out of the sleeve 100 which extension 102 is adapted to be connected to the throttle pedal of a vehicle thereby providing an input control member for the TV valve 54. The compression spring 94 transmits the throttle force or position from the input member 96 to the valve spool 90 such that a pressure can be generated by the valve spool 90 proportional to throttle position. In the position shown the valve spool 90 is in fluid communication with RNDI passage 66 intermediate lands $a$ and $b$, a throttle valve pressure (TV) passage 104 adjacent land $b$, and an exhaust passage intermediate lands $b$ and $c$. The TV passage 104 is also in fluid communication with a chamber 106 formed between the end of valve bore 92 and valve land $c$. The sleeve 100 has three ports 108, 110, and 112 which are in fluid communication with a shift TV (STV) passage 38, a part throttle TV (PTV) passage 114, and a detent (DET) passage 116, respectively. In the position shown, the shift TV passage 38 is open to the differential area between valve land 98 and extension 102 through opening 108 while the part throttle Tv passage 114 and detent passage 116 are connected to exhaust through openings 110 and 112, respectively. As the input member 96 is moved to the right through the operation of the vehicle throttle, the valve land 98 will progressively provide communication between the shift TV passage 38 and the part throttle TV passage 114, and then opening the detent passage 116 to the shift TV passage 38. Also, as the input member 96 is moved to the right, the force in spring 94 will increase thereby causing an increase in pressure in the TV passage 104. As the spring force in spring 94 increases, the valve spool 90 is urged toward the right to permit fluid communication between the RNDI passage 66 and the Tv passage 104. Since the pressure in the RNDI passage is equal to line pressure, the TV passage pressure increases. The increase of pressure in TV passage 104 is communicated to the chamber 106 where it acts on valve land $c$ to balance the force in spring 94. Thus with increasing throttle position, increasing TV pressure will result. If the throttle position is decreased, the pressure in chamber 106 will be great enough to overcome the force of spring 94 which will cause the valve spool to move to the left thereby providing communication between the Tv passage 104 and the exhaust passage to permit a reduction of TV pressure until the spring force is accordingly balanced. The TV pressure in passage 104 is communicated to the shift modulator valve 52. The part throttle TV passage 114 is in fluid communication with 2-3 shift valve 58. The detent passage 116 is in fluid communication with the 1-2 shift valve 56 and the 2-3 shift valve 58. As will be explained below, shift TV pressure in passage 38 increases directly with TV pressure in passage 104 up to a predetermined level. Since the shift TV passage acts on the differential area of valve land 98 and the other side of the valve land 98 is exhausted, the force on the input member 96 which would normally increase with increasing force of spring 94 is substantially balanced, thus providing the operator with a consistent feel of the accelerator pedal. However, when the predetermined pressure is reached in the shift TV passage 38, further increase in pressure is not permitted. This point is reached when the input member 96 is substantially adjacent the detent opening 112. Thus the change in throttle position through the detent position is met with an increased reaction force to the operator such that through detent feel is given to the throttle valve.

SHIFT MODULATOR

The shift modulator valve 52 includes a valve spool 118 having equal diameter spaced lands a and b and a larger diameter land c slidably disposed in a stepped bore 120, and a compression spring 122 compressed between one end of the valve bore 120 and valve land c. The valve bore 120 is in fluid communication with the shift TV passage 38, the TV passage 104, a third clutch passage 124 and a third accumulator passage 126. In the position shown, both the shift TV passage 38 and the TV passage 104 are in fluid communication with the valve bore 120 intermediate land b and c while the third clutch passage 124 is blocked by land b and the third accumulator passage 126 is open between lands a and b. The TV pressure acts on the differential area between lands b and c such that as TV pressure increases, the unbalanced force on the differential area will cause the valve spool 118 to move to the right against spring 122. When a predetermined pressure has been reached in the TV passage 104 the valve spool 118 will have been moved to the right sufficiently such that valve land b will block further fluid communication between the TV passage 104 and the differential area between lands b and c such that at this time shift TV pressure in passage 38 will be at maximum and remain constant for further increases in TV pressure.

As the valve spool 118 is moving to the right, by increasing TV pressure, at a predetermined TV pressure, less than maximum STV pressure, valve land b will open for fluid communication between the passages 124 and 126 intermediate a and b. The third clutch passage 124 is in fluid communication with the direct reverse clutch 82, a third clutch exhaust valve 128, and through a restriction 130 with the third accumulator passage 126. The third accumulator passage 126 is in fluid communication through a one-way check valve 132 with the third clutch passage 124 and with an intermediate servo 134. A restriction 135 is positioned in the third accumulator passage 126 between the shift modulator valve 52 and the intermediate servo 134. The restriction 135 is of a larger diameter than the restriction 130 and the function of these restrictions will be described later. The check valve 132 permits free fluid communication between the third clutch passage 124 and the third accumulator passage 126 when the pressure in the third clutch passage 124 is higher than pressure in the third accumulator passage 126. However, when fluid pressure in the third accumulator passage 126 is higher than pressure in the third clutch passage 124, the ball check valve 132 will be closed to prevent fluid communication therebetween. When the ball check valve 132 is closed, fluid communication from the third accumulator passage 126 is maintained with the third clutch passage 124 through either restriction 135 or 130, depending upon the position of the valve spool 118 of the shift modulator valve 52.

GOVERNOR

The governor passage 86 is in fluid communication with a governor 136. The governor 136 includes a shaft member 138 rotatably supoorted in the transmission casing at both ends thereof. A blind passage 140 is centrally disposed axially in the shaft 138 and communicates with the governor passage 86. A pair of frusto conical openings 142 and 144 are formed in the shaft 138 and communicate with the central passage 140 and with the sump of the transmission case. A ball 146 is disposed in the opening 142 and a ball 148 is disposed in the opening 144. The ball 146 abuts an arm 150 which is integrally formed on a governor flyweight 152 which is pivotally connected to the shaft 138. The ball 148 abuts an arm 154 which is integral with the governor flyweight 156 which is also pivotably mounted on the shaft 138. A compression spring 158 is disposed between the flyweight 152 and the shaft 138 which urges the weight 152 outward providing a preload on the ball 146 through the arm 150. When the governor is not rotating a ball 148 is free in the opening 144 to permit unrestricted exhaust from control passage 140 and governor passage 86. The shaft 138 is secured to the gear 160 which is adapted to be driven by the transmission output shaft, not shown, such that the governor is rotated proportionately with the transmission output speed. When the governor 136 is driven by the transmission output shaft, the weights 152 and 156 move outwardly under the centrifugal force imposed thereon. The centrifugal force on weight 152 is transmitted to ball 146 through the arm 150, and the centrifugal force on weight 156 is transmitted to the ball 148 through the arm 154. The weight 156 has a greater mass in the weight 152 such that at a given transmission output speed, the centrifugal force imposed on ball 148 will be greater than the centrifugal force imposed on ball 146. The spring 158 provides a preload on the ball 146 such that at low output speeds, the combined forces of the spring 158 and the weight 152 are greater than the centrifugal force of the weight 156 on ball 148. Thus at low transmission output speeds, the ball 148 is unseated by fluid pressure in passage 86 to permit controlled exhaust of the fluid pressure therein. Since the governor passage 86 is supplied through a restriction 85 from drive passage 74, the opening of the ball 148 controls the pressure in passage 86. This is an exhaust control type governor. At a predetermined output speed the force imposed by the centrifugal weight 156 will be equal to the force imposed by the centrifugal weight 152 and spring 158. Above this speed, the force on ball 148 will increase at a greater rate than the force on ball 146. Therefore above this predetermined speed, the ball 146 will be forced open by fluid pressure in the governor passage 86 and this ball 146 will thereafter control the exhaust of governor pressure. This provides a breaking type governor curve or a two-stage governor curve shown in FIG. 8, as it is commonly termed. The fluid pressure in the governor passage 86 is communicated to the third clutch exhaust valve 128, the 1–2 shift valve 56, and the 2–3 shift valve 58.

1–2 SHIFT VALVE

The 1–2 shift valve 56 includes a valve spool 162 having spaced equal diameter lands a and b and a larger diameter land c slidably disposed in a stepped valve bore 164, a valve spool 166 having equal diameter lands a and b, a larger diameter land c, a yet larger diameter land d, and still further larger diameter land e slidably disposed in a stepped valve bore 168 formed in a sleeve 170 which is secured in the valve bore 164, and a compression spring 172 compressed between valve land a of valve spool 166 and the end of valve bore 168 formed in the sleeve 170. The valve bore 164 is in fluid communication with the governor passage 86 at a control chamber 174 formed between valve land a of spool 162 and the end of valve bore 164, a drive passage 74 intermediate lands a and b of spool 162, and a second ratio apply passage 176 intermediate valve spools 162 and 166 and intermediate valve lands b and c of spool 162, and an exhaust passage 178 intermediate valve spools 162 and 166. The valve bore 168 is in fluid communication with a low feed passage 180 intermediate lands d and e of spool 166, the low passage 76 intermediate lands c and d, the detent passage 116 intermediate lands b and c, an exhaust passage 182 intermediate lands a and b, the shift TV passage 38 adjacent one end of valve land a, and a passage 184 which is connected between one end of valve bore 168 and adjacent valve land a. In the downshifted position shown, the drive passage 74 is blocked from fluid communication with the second ratio apply passage 176 by valve land b, the second ratio apply passage 176 is exhausted at 178, the low passage 76 and low feed passage 180 are connected adjacent land d, the detent passage 116 is open to the differential area between lands b and c, the shift TV passage 38 is open to the end of valve land a, and the passage 184 is blocked at one end by valve land a. In the upshifted position, the drive passage 74 is in fluid communication with the second apply passage 176 between lands a and b while the second apply passage 176 is blocked from exhaust by valve land c, the low passage 76 is blocked from fluid communication with the low feed passage 180 by valve land e, the detent passage 116 remains open to the differential area between lands b and d, and the shift TV passage 38 is blocked by valve land a while the passage 184 is open to exhaust 182 between lands a and b. Thus, in the upshifted position the shift TV bias on the end of valve spool 166 is exhausted and cooperates with the differential area between lands b and c of spool 162 to create an upshift hysteresis of the 1-2 shift valve 56. The 1-2 shift valve 56 is a governor and throttle pressure controlled shift valve similar in operation to the shift valves normally used in automatic transmissions. The shift valve remains in the downshifted position shown until governor pressure in passage 86 is sufficient to overcome the force of spring 172 and shift TV pressure acting on the end of land a of spool 166. When the governor pressure does overcome the downshift biases created by shift TV and the spring 172, the valve spools 162 and 164 will move to the upshifted position. In the upshifted position the shift TV bias, as previously mentioned, is exhausted. The detent passage 116 will provide a downshift bias on the valve spool 166 when the detent passage is opened to STV pressure in passage 38 through the throttle valve 54, if the operator should request a forced or detent downshift by moving the vehicle throttle pedal to the floor. The STV pressure will cause the 1-2 shift valve 56 to downshift if the STV pressure in detent passage 116 acting on the differential between lands b and d of spool 166 and the force in spring 172 is sufficient to overcome governor pressure acting on valve land a of spool 162. If a forced downshift should occur, shift Tv pressure in passage 38 will again be acting on valve land a thus providing an upshift hysteresis after the forced downshift has occurred, however, STV pressure in passage 116 will act on the differential area of lands b and c. That is, after a forced downshift has occured, a higher governor pressure will be required to then upshift the transmission control from first to second ratio.

2-3 SHIFT VALVE

The 2-3 shift valve 58 is a two spool valve similar to the 1-2 shift valve 56 described above. The shift valve 58 includes a valve spool 186 having equal diameter spaced valve lands a and b and a larger diameter land c slidably disposed in a stepped valve bore 188, a valve spool 190 having equal diameter spaced lands a and b, a larger diameter land c and an even larger diameter land d slidably disposed in a stepped bore 192 formed in a sleeve 194 which is secured in the valve bore 188, and a compression spring 196 which is compressed between one end of valve bore 192 and land a of valve spool 190. The valve bore 188 is in fluid communication with the governor passage 86 at a chamber 198 formed between the end of bore 188 and valve land a of spool 186, the RND passage 68 intermediate lands a and b, a third clutch feed passage 200 intermediate lands b and c and intermediate valve spools 186 and 190, and the reverse passage 70 intermediate the valve spools 186 and 190. Valve bore 192 is in fluid communication with the detent passage 116 intermediate lands c and d, the part throttle TV passage 114 adjacent land a, the shift TV passage 38 intermediate one end of land a of spool 190 and the end of valve bore 192, and a passage 202 connected between one end of valve bore 192 and the space intermediate lands a and b. In the downshifted or intermediate gear ratio position shown, the RND passage 68 is blocked from the third clutch feed passage 200 by land b, the reverse passage 70 is open to the third clutch feed passage 200 between valve spools 186 and 190, the detent passage 116 is open to the differential area between lands c and d, the part throttle TV passage 114 blocked by land a, the shift TV passage 38 is opened to the area between land a and the end of valve bore 192, and the passage 202 is opened to the shift TV passage 38 and the differential area between lands a and c. In the upshifted or direct drive position, the RND passage 68 is opened to the third clutch feed passage 200, the reverse passage 70 is blocked by land c of spool 186 from communication with the third clutch feed passage 200, the detent passage 116 is open to the differential area between lands b and d of spool 190, the part throttle TV passage 114 is open to the differential area between lands a and b and to the passage 202, and the shift TV passage 38 is blocked by valve land a. The 2-3 shift valve 58 is also a governor and throttle pressure controlled valve which operates in a manner similar to the prior art shift valves and similar to the 1-2 shift valve 56. When the governor pressure in passage 86 is sufficient to overcome the shift TV pressure in passage 38 and the force of spring 196 the shift valve 58 will move, from the downshifted position shown, to the upshifted position. On a normal upshift, the shift TV bias will be exhausted through passage 202 and the part throttle TV passage 114 at the throttle valve 54, thus providing an upshift hysteresis. A hysteresis is also provided by the differential area between lands b and c which is acted upon by the line pressure in the third passage 200. If the upshift from second to third should occur before the operator has opened the part throttle TV opening 110 in the throttle valve 54, and the operator should rapidly advance the throttle pedal past the part throttle opening 110, the part throttle TV pressure will be transmitted to the differential area between lands a and b and to the end of land a on the shift valve 58 to cooperate with the spring 196 to act against governor pressure in passage 86. Since there has been a rapid change in TV pressure and very little if any change in governor pressure at this time, the shift valve will downshift. This provides a part throttle downshift control in the transmission of the vehicle to permit a rapid part throttle interchange between second and third gears to provide increased performance in the transmission. The upshift would occur, after a part throttle downshift, when the governor pressure in passage 86 was sufficient to overcome the TV and spring biases on the shift valve. However, after an upshift at this time the TV bias would remain on the shift valve since the part throttle TV passage 114 would be open between lands a and b. A further downshift, however, would not occur until the operator depressed the throttle beyond the detent position at which time detent pressure would operate on the differential area between lands b and d and cooperate with the TV and spring biases on the shift valve to create a forced downshift force or unless governor pressure in passage 86 should decrease. After a detent downshift, an upshift will occur when governor pressure increases sufficiently to overcome the biases on the shift valve.

LOW CONTROL VALVE

The low control valve 80 includes a valve spool 204 having equal diameter spaced lands a and b and a larger diameter land c slidably disposed in a stepped valve bore 206, and a compression spring 208 compressed between valve land c and one end of valve bore 206. The valve bore 206 is in fluid communication with the reverse passage 70 adjacent one end of valve land a, the low feed passage 180 intermediate lands a and b, and a low reverse apply passage 210 intermediate lands b and c. The low reverse apply passage 210 is in fluid communication with a friction drive establishing device 212, which is similar in construction to the low reverse friction drive establishing device shown in U.S. Pat. No. 3,541,887 issued to Van Lent et al, Nov. 24, 1970, and assigned to the assignee of the present invention, with the exception that the piston in the friction device 212 is a single area piston rather than a double area piston. The prior art transmissions such as the transmission disclosed in Van Lent et al use double area pistons when the friction device is to be used for two gear ratios. This permits the use of line pressure in the separate areas to engage the piston of the friction device at a single pressure while permitting different apply forces for the two ratios to be engaged. For example, reverse drive needs a higher engagement force because of the higher torque that must be transmitted to the drive shaft during reverse drive. In the present control, a single area piston is used and the engagement pressure is modified by the low control valve 80 to provide one pressure in reverse and a lower pressure in low gear such that the different engagement forces can be accomplished. When the manual valve 20 is conditioned for reverse drive, line pressure in passage 70 is directed to the end of valve land a of the low control valve 80 to cause the valve spool 204 to move leftward against the spring 208 to open fluid communication between reverse passage 70 and the low reverse engage passage 210 past the face of valve land a. This permits full line pressure to be utilized to engage the friction device 212. When the manual valve 20 is conditioned for low drive, line pressure is communicated through the low passage 76 to the 1–2 shift valve 56 and then through the low feed passage 180 to the low control valve 80 where the pressure is communicated between lands a and b to the low reverse feed passage 210. Pressure in the low reverse feed passage 210 then acts on the differential area between lands b and c to cause the valve spool 204 to move leftward against the spring 208. At a predetermined pressure, below full line pressure, the valve spool 204 will have moved sufficiently to the left such that valve land a will close fluid communication between passages 180 and 210 to limit further increase in the apply pressure in passage 210. Thus, the apply pressure for the low drive is less than line pressure and substantially less than the apply pressure used in the reverse drive.

INTERMEDIATE-LOW BOOST VALVE

The intermediate-low boost valve 50 includes a valve spool 214 having equal diameter spaced lands a and b and a smaller diameter land c slidably disposed in a stepped valve bore 216, and a compression spring 218 compressed between one side of valve land a and the end of valve bore 216. The valve bore 216 is in fluid communication with the intermediate passage 78 between lands a and b and with the intermediate boost passage 46 between lands a and b when the valve spool 214 is in the spring set position and with a chamber 220 formed by valve land c in one end of valve bore 216. When the manual valve 20 is moved to the intermediate position or the low position, fluid pressure in passage 78 is communicated to the intermediate-low boost valve 50 between lands a and b. Fluid pressure is then communicated between lands a and b to the intermediate boost passage 46. Fluid pressure in the intermediate boost passage 46 operates on the end of land c in chamber 220 to move the valve spool 214 to the left against spring 218 to discontinue fluid communication between passages 78 and 46 when a predetermined pressure has been achieved at passage 46. The fluid pressure in the intermediate boost passage 46 is transmitted through the shuttle valve 42 and the shuttle valve 36 to the line boost passage 34, from which it is communicated to the boost chamber 32 of the regulator valve 18. The fluid pressure of the boost chamber 32 assists the spring in providing a bias on the regulator valve 18 to create a line pressure that is higher than would be achieved with the spring 26 alone. Thus in the low and intermediate forward drives, line pressure is boosted a fixed level above the level determined by the spring 26.

REVERSE BOOST VALVE

The reverse boost valve 48 includes a valve spool 222 having equal diameter spaced lands a and b and a larger diameter land c slidably disposed in a stepped valve bore 224, and a compression spring 226 compressed between one end of valve bore 224 and one side of land c. The valve bore 224 and valve land c cooperate to form a control chamber 228 which is in fluid communication with the shift TV passage 38, and the valve land a and valve bore 224 cooperate to form a control chamber 230. The control chamber 230 is in fluid communication with an axially drilled blind passage 232 in the valve spool 222. The passage 232 is in fluid communication with a restricted passage 234 which communicates with the outer circumference of valve spool 222 intermediate lands a and b. In the spring set position, the area intermediate lands *a* and *b* is in fluid communication with the reverse boost passage 44 and with the reverse passage 70. When the manual valve is positioned for reverse drive, fluid pressure in passage 70 is communicated between lands *a* and *b* to the reverse boost passage 44. Pressure in the reverse boost passage 44 is transmitted through the restricted passage 234 and the axial passage 232 to the control chamber 230 where it acts upon the valve land a to cause the valve spool 222 to move to the left against spring 226 and STV pressure. The valve spool will continue its leftward movement until sufficient pressure is developed in chamber 230 to move the valve spool such that valve land *a* will close the reverse passage 70. The necessary pressure in control chamber 230 is determined by the bias spring 226 and the shift TV pressure in chamber 228. The spring 226 provides a fixed bias level which is the minimum level at which the valve spool 222 will move. As shift Tv pressure increases in chamber 228, higher pressure will be necessary in chamber 230 and therefore in the reverse boost passage 44 to cause the valve spool to close the reverse passage 70. Thus the pressure in the reverse boost passage 44 is proportional to shift TV pressure and has a minimum value. The pressure in the reverse boost passage 44 is communicated through the shuttle valve 42 to the RIL passage 40, and then through shuttle valve 36 to the line boost passage 34 from which line boost passage 34 is communicated to the boost chamber 32 of the regulator valve 18. Since the line boost pressure in reverse increases proportionately with shift TV pressure, the pressure in chamber 32 is a variable pressure which results in creating a variable line pressure in passage 16. The line pressure in reverse, therefore, varies with shift TV pressure which is proportional to engine torque demand. This permits the line pressure to increase with increasing torque demand such that the holding force placed on the friction drive establishing devices in the transmission is controlled somewhat proportionately to torque demand on the engine. This also permits an N to R shift at minimum pressure which results in smooth engagement of the clutch 82 and brake 212.

TRIM VALVE

The trim valve 60 includes a valve spool 236 having spaced equal diameter lands *a* and *b* and a larger diameter land *c* slidably disposed in a stepped valve bore 238, and a compression spring 240 compressed between valve land a and one end of valve bore 238. The valve land *a* and valve bore 238 cooperate to provide a chamber 242 which is in fluid communication with the shift TV passage 38. The valve land *c* and valve bore 238 cooperate to provide a control chamber 244 which is in fluid communication with a trim passage 246. The valve bore 238 is also in fluid communication with the drive passage 74, the trim passage 246, and an exhaust passage 248. In the spring set position of the valve spool 236, the drive passage 74 is in fluid communication between land *a* and *b* with the trim passage 246. Thus when the manual valve 20 is positioned for forward drive, fluid pressure in passage 74 is communicated between lands *a* and *b* of valve spool 236 and trim passage 246. The trim passage 246 is in fluid communication with a 1-2 accumulator 250. Fluid pressure in the trim passage 246 also acts on valve land *c* in chamber 244 to cause the valve spool 236 to move to the right such that valve land *b* will discontinue fluid communication between passages 74 and 246 and if sufficient movement is obtained in the valve, spool 236 will open trim passage 246 to exhaust passage 248. Shift TV pressure in passage 38 operates on the end of valve land *a* of chamber 242 to establish a bias on the valve spool 236 which is proportional to engine torque demand or throttle position. The bias spring 240 and pressure in chamber 242 establish the pressure level to be obtained in the trim passage 246. Thus with increased engine torque demand, the trim pressure in passage 246 will increase.

1-2 ACCUMULATOR

The 1-2 accumulator 250 includes a piston 252 slidably disposed in a housing 254 in the manner shown to provide an accumulator chamber 256 and a trim control chamber 258. The trim control chamber 258 also has disposed therein, between the piston 252 and the transmission case, a spring 260. During operation of the transmission on an upshift from first to second, intermediate apply pressure in passage 176 is communicated to the accumulator chamber 256 to cause the piston to move in the housing 254 to provide a control of the apply pressure in the intermediate servo 134. During operation, the higher the trim pressure in chamber 258, the higher will be the level of apply pressure in the intermediate servo 134. Therefore, the intermediate servo will be applied at a higher apply pressure level at high throttle settings. This is a desirable control function since higher apply pressures are necessary at higher torque demands. This type of servo pressure control is also shown in U.S. Pat. No. 3,321,056.

3RD CLUTCH EXHAUST VALVE

A third clutch exhaust valve 128 includes a valve spool 262 having a small land a and a larger land b slidably disposed in a stepped valve bore 264, and a spring 266 compressed between valve land b and one end of valve bore 264. The valve land a and bore 264 cooperate to provide a pressure chamber 268 which is in fluid communication with the third clutch apply passage 124. The third clutch apply passage 124 is also in fluid communication, through a restriction 270, with the third clutch feed passage 200 which is in fluid communication with the valve bore 164 at a positioin adjacent valve land *a*. The valve bore 264 is also in fluid communication with the governor passage 86 at the differential area between lands *a* and *b*. Fluid pressure in the third clutch passage 124 operates in chamber 268 and cooperates with governor pressure in passage 86, operating on the differential area between lands *a* and *b*, to move the valve spool 262 to the right against spring 266 to permit fluid pressure in passage 124 to bypass the restriction 270 through a ball check valve 272 when the third clutch is being exhausted such as during a 3-2 downshift. At high vehicle speeds the third clutch will be permitted to exhaust rapidly through the ball check valve 272 while at lower speeds the third clutch pressure will be exhausted through the restriction 270 at a slower rate.

INTERMEDIATE SERVO

The intermediate servo 134 operates a conventional band type brake used in many prior art transmissions including U.S. Pat. No. 3,321,056. The intermediate servo 134 includes a piston 274 which is slidably disposed in a cap member 276 and in a portion of the transmission housing 278. A rod 280 is operatively connected to the piston 274 by a lock ring 280a and a shoulder on rod 280 such that, as the piston 274 is stroked in the cap 276 and housing 278, the rod 280 is moved to cause the brake band to engage. A compression spring 282 is disposed between the piston 274 and the transmission case to urge the piston 274 to the position shown which is the release position for the intermediate servo. A pair of seals 284 and 286 are positioned on one side of the piston from a chamber 290 on the other side of the piston. Since, as is seen, the piston 274 is not a single diameter piston, there is a differential area between the sealed portions 284 and 286. This differential area 292 is connected to exhaust. A rod 280 has a central passage 294 which is in fluid communication with a second ratio engage passage 176 and with the chamber 288. Thus when the second ratio engage passage 176 is pressurized by an upshift at the 1–2 shift valve 56, the fluid pressure is transmitted to the chamber 288 to apply the intermediate servo 134. The application pressure of the intermediate servo 134 is determined by the trim bias in the 1–2 accumulator 250 as discussed above. When an upshift from second to third occurs, fluid pressure in the third accumulator passage 126 is communicated to the chamber 290 of the intermediate servo 134. Since the chamber 290 is a larger area than the chamber 288 and since the spring 282 cooperates to assist the force in the chamber 290, the intermediate servo 134 is released when the third clutch accumulator pressure in passage 126 reaches a predetermined level. Thus as the third clutch is engaged, since third accumulator pressure in passage 126 is substantially equal to third clutch pressure in passage 124 during engagement of the clutch, the intermediate servo is disengaged simultaneously with the engagement of the third clutch. This is termed a washout shift. With the use of this type of a second to third shift procedure, it is not necessary to use a one-way drive establishing device for establishing the intermediate drive ratio in the transmission as used in U.S. Pat. No. 3,321,056.

The drive establishing device 82 which is the direct and reverse clutch, is similar in construction to the direct and reverse clutches shown in U.S. Pat. Nos. 3,321,056 and 3,541,887. This clutch is a dual area clutch having one apply area to establish the direct or third ratio and a second area to establish the reverse ratio. During the reverse drive the second area and the first area are both applied to provide sufficient engagement force for the clutch during reverse drive. It is also possible to use a single area piston such as is used for the low reverse friction drive establishing device 212; however, to use a single area piston in specific transmissions would not be acceptable since the third clutch apply pressure would be relatively low compared to the piston area involved and the return spring forces which are utilized. However if the third clutch engagement pressure is high, compared to the reverse clutch engagement pressure, in the particular transmission application, a single area piston could be used and a control valve similar to the low control valve 80 could be used to control the third and reverse clutch engagement pressures. The forward clutch 88 is a single area piston type clutch similar to those shown in U.S. Pat. Nos. 3,321,056 and 3,541,887.

Figure 18:
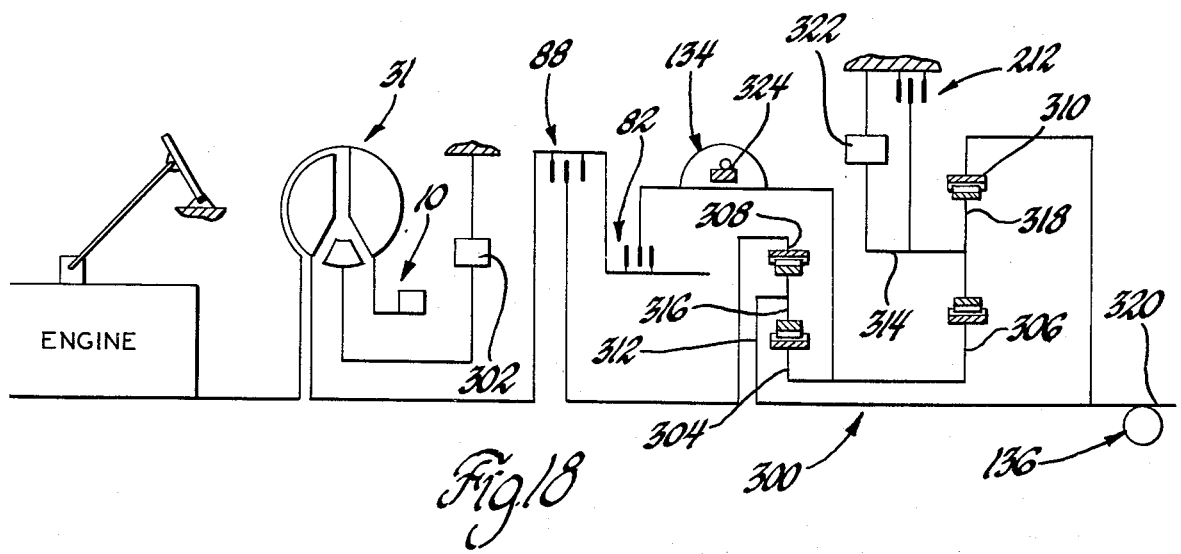
FIG. 18 is a schematic diagram of a transmission gearing arrangement which may be used with the control system of this invention.

The above described control is preferably used with transmissions having planetary gear sets such as shown in U.S. Pat. No. 3,541,887 with the exception that the one-way drive establishing device used in conjunction with a friction drive establishing device is not used to establish the intermediate ratio. This permits a more economical transmission to be produced. The use of a "washout" shift between second and third ratio interchanges eliminates the need for the one-way device. A transmission utilized with this control would preferably use a one-way drive establishing device for a low-ratio. A schematic representation of such a transmission is shown in FIG. 18. This transmission incorporates the converter 31, a planetary gear set 300, and a one-way brake 302 for the stator of the converter 31. The planetary gear set 300 has a pair of interconnected sun gears 304 and 306, ring gears 308 and 310, and planet carriers 312 and 314 on which are rotatably mounted pinion gears 316 and 318 respectively, meshing with sun gear 304 and ring gear 308 and sun gear 306 and ring gear 310. The ring gear 310 and carrier 312 are drivingly connected to an output shaft 320 which drives the vehicles wheels, not shown, and governor 136. The carrier 314 may be held stationary by brake 212 or by a one-way device 322. The sun gear 304 and 306 may be driven by the converter 31 through clutch 82 or be held stationary by a brake band 324 operated by the servo 134. The ring gear 308 may be driven by the converter 31 through clutch 88.

In neutral, all clutches are released. In reverse, clutch 82 and brake 212 are engaged. in manual low forward, clutch 88 and brake 212 are engaged, while in automatic low forward brake 212 is disengaged and the one-way device 322 is operable. In intermediate forward, clutch 88 and brake band 324 are engaged. In direct or third gear forward, both clutches 82 and 88 are engaged. A more complete description of this gearing arrangement and the power paths therethrough can be found in U.S. Pat. No. 2,856,794 issued to H. W. Simpson, Oct. 21, 1958.

LINE BOOST

Figure 3:
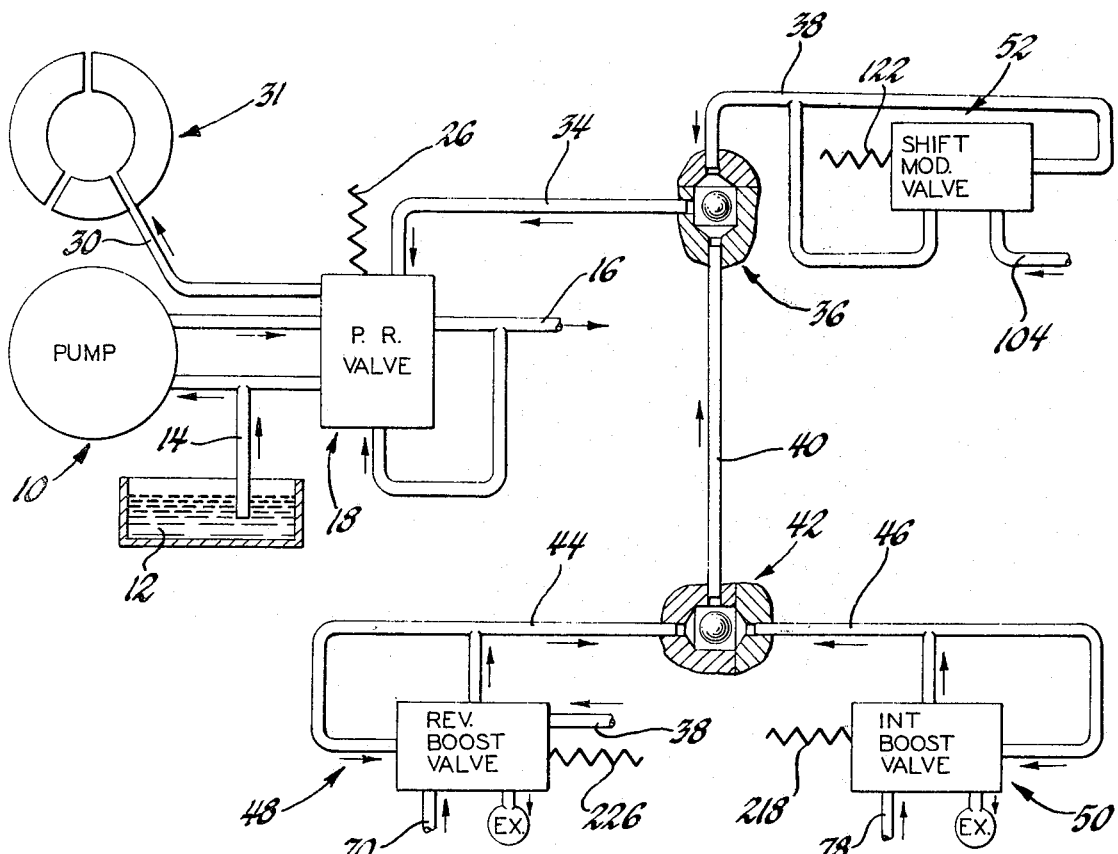
FIG. 3 is a schematic diagram of the valving associated with the pressure boost system.
Figure 4:
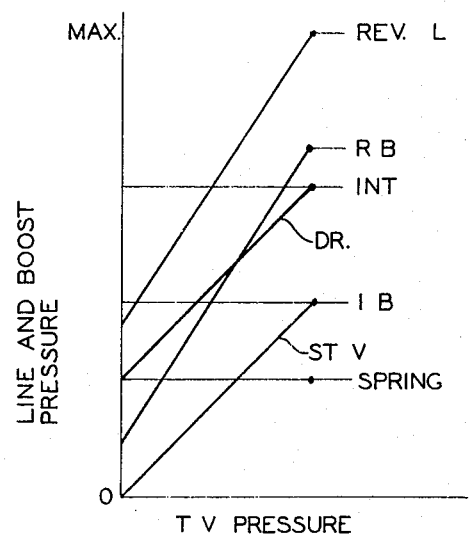
FIG. 4 is a graph showing the pressure relationship in the pressure boost control system.

FIGS. 3 and 4 describe the pressure boost system used with the complete transmission control described above. In FIG. 3 the pressure regulator valve 18, reverse boost valve 48, and the intermediate-low boost valve 50 are shown in schematic form. As described above the reverse boost valve receives fluid pressure from the manual control valve 20 through passage 70, and distributes a reduced pressure proportionate to shift TV to the ball check valves 42 and 36 from where it is communicated to the pressure regulator valve 18 through passage 34. The intermediate boost valve 50 receives fluid pressure from the manual valve 20, when the manual valve 20 is in the intermediate or low position, and delivers a constant reduced pressure to passage 46, which is communicated through ball check valves 42 and 36 to the line boost passage 34, which is in communication with the pressure regulator valve 18. When the manual valve 20 is in the neutral or drive position, the reverse boost valve 48 and intermediate boost valve 50 are both inoperative and therefore, fluid pressure in the shift TV passage 38 is communicated to the ball check valve 36 to the line boost passage 34 to provide a boost on the pressure regulator valve 18 which is proportional to shift TV pressure.

FIG. 4 is a plurality of graphs which describe the various boost pressures and line pressures which are found in this system. The spring 26 of the pressure regulator valve 18 provides the minimum pressure in the main line passage 16. That is if no boost pressures are available to the regulator valve 18 a minimum system pressure is set by the spring 26. The shift TV pressure varies from zero to some predetermined value, for example 100 PSI. As explained above the shift modulator valve 52 limits the shift TV pressure to this predetermined amount. The intermediate boost pressure in passage 46 is a fixed value for all throttle settings. In the preferred embodiment of this transmission control, it has been designed to be equal to the maximum shift TV pressure. The reverse boost pressure in passage 44 has a minimum value, which is established by spring 226, and varies above this minimum value proportionate to shift TV pressure. The particular system described above provides for a reverse boost that increases at a more rapid rate than shift TV pressure. This is accomplished by making valve land $c$ of spool 222 greater in diameter than valve land $a$. Thus with an increase in shift pressure on valve land $c$ an accompanying increase in reverse boost pressure must be had on valve land $a$. Since the diameters are different, the reverse boost pressure must be significantly greater and increase more rapidly than the shift TV pressure. The pressures will be related to the inverse area of the valve lands with which they are associated.

Line pressure in the system which is in passage 16, varies directly with shift Tv pressure from the minimum spring setting when the manual valve is conditioned for drive operation. As is seen on the curve in FIG. 4 the line pressure starts at a point which is equal to the spring 26 and advances upwardly in paralllel relationship with the shift TV pressure curve also shown in FIG. 4. When the manual valve 20 is conditioned for intermediate or low operation, the line pressure is a constant at a value equal to the intermediate boost value plus the spring pressure valve. Therefore as seen in FIG. 4 the line pressure in intermediate and low is displaced upward from the spring 26 pressure line in an amount equal to the intermediate boost pressure. When the manual valve 20 is conditioned for reverse operation, the line pressure in passage 16 will follow the curve shown for reverse line pressure in FIG. 4. Since the reverse boost has a fixed minimum value, this value must be added to the fixed spring pressure. Therefore, as seen the reverse line pressure begins at a value above the spring 26 pressure setting and rises from there on a curve parallel to the reverse boost line. It can be seen that the reverse boost and shift Tv lines on the curve are diverging thereby showing that the reverse boost pressure increases with shift TV pressure, but at a more rapid rate. As will be noted in FIG. 4 all of the pressure curves have an end portion which is flat and parallel to the TV pressure abscissa of the curve. This is produced by the shift modulator valve 52 which prevents the increase of shift TV pressure above a predetermined TV pressure.

TV CONTROL

The throttle valve control system is shown in FIGS. 5 and 6. FIG. 5 shows the valves associated with the throttle system in the schematic diagram, and FIG. 6 shows the curve relationship between carburetor angle, or throttle plate opening, and pressure values. As seen in FIG. 5, and previously described, pressure is distributed to the throttle valve 54 through the RNDI passage 66 when the manual valve 20 is in either the reverse, neutral, drive or intermediate positions. The throttle valve 54 has two separate valve spools as described above, a pressure reducing valve 90 and the manual control valve 96. The manual control valve 96 is operated by the accelerator pedal of the vehicle to transmit a force through spring 94 to the reducing valve 90. Line pressure in passage 66 is then reduced by the valve 90 and delivered to the TV passage 104 at a value proportionate to the force on the manual control valve 96 which is proportional to the carburetor setting. The pressure in TV passage 104 is directed to the shift modulator valve 52 from where it is distributed to the system to perform the necessary function. The pressure in shift TV passage 38 is also communicated back to the manual control falve 96 to provide an operator assist for manipulating the valve, this assist permits the input force by the operator to be essentially constant while shift TV pressure increase with TV pressure. As described above, the shift modulator valve functions to prevent a further increase in shift TV pressure above a predetermined throttle pressure. In the transmission controls described above this pressure setting has been established to be 100 PSI. The curve in FIG. 6 shows a straight line relationship between carburetor angle and TV and shift TV pressure up to the maximum shift TV value. At this point on the curve, STV pressure remains constant while TV pressure continues to increase. It is also seen on the curve in FIG. 6 that part throttle TV pressure in passage 114 is introduced into the system through the manual control valve 96 at a predetermined carburetor setting. It is also seen in FIG. 6 that detent pressure is introduced into the system at a predetermined carburetor setting. The detent pressure for the particular control described above, which is the preferred embodiment of this invention, is equal to the maximum shift TV pressure. The controlling of detent pressure in this manner permits consistent detent forced downshifts. The change in relationship between TV pressure and shift TV pressure, which is generated in the shift modulator valve 52, permits an increase operator resistance to movement of the manual control valve 96. This provides the operator with a feedback signal which indicates that he has gone beyond the detent point in the control system. This increase in forces is due to the fact that above maximum shift TV pressure, the feedback pressure in passage 38 remains constant on the manual control valve 96 while the further increase in spring force is necessary to reach maximum TV pressure which force increase must be supplied by the operator.

GOVERNOR

FIG. 7 and 8 show the governor 136 which may be constructed in accordance with U.S. Pat. No. 3,559,667, and the governor pressure versus transmission output speed curve respectively. In FIG. 7, the governor as described, is driven by the output shaft 320 of the transmission, and therefore rotates at output speed. The flyweights 142 and 156 generate forces proportional to the speed of the governor 136 which are transmitted to the ball valves 146 and 148 respectively through the arms 150 and 154 respectively. The spring 158 provides a preload force on the ball valve 146, such that at zero output speed, the ball check valve 146 remain seated and pressure in the governor passage is controlled by exhausting past the ball valve 148 only. As shown in FIG. 7, the ball valves 146 and 148 have an area A which is in fluid communication with the pressure in the governor passage 86. Also shown is the flyweight 156 which has a force F1 acting thereon, and the flyweight 152 has a force F2 plus Fs acting thereon. The governor pressure in the low speed ranges, as seen in FIG. 8 is equal to the force F1 on the flyweight 156 divided by area A. As seen in FIG. 8 this pressure function increases proportional to the square of the speed of the output shaft. The pressure will continue to increase along this curve until it intersects the pressure curve generated by the exhaust of pressure through ball valve 146. The exhaust of pressure through ball valve 46 establishes a governor pressure which is equal to F2+Fs divided by area A. It is seen in FIG. 8 that this curve also increases at a rate which is proportional to the square of output speed but has a much flatter increase than the increase caused by the force F1 during the lower speed range. This provides a stepped or breaking governor curve which is desirable in automatic transmissions since it provides a very flat governor curve over two different output speed ranges which permit consistent shifting characteristics in the transmission.

1-2 SHIFT CONTROL

The 1-2 shift control system is described in FIG. 9, 10, and 11. FIG. 9 is a schematic diagram of the valves described above for the entire control system which contributes to the 1-2 shift function. FIGS. 10 and 11 are curves which describes the trim pressure versus shift TV pressure and second servo pressure versus time, respectively. As seen in FIG. 9, drive pressure is directed to the 1-2 shift valve 56 such that at a predetermined governor pressure 86 and shift TV pressure 38, the 1-2 shift valve 56 will upshift thereby directing fluid pressure to the second ratio apply passage 176. The fluid pressure in the passage 176 operates on the servo 134 to engage the intermediate break band 324, and also operates on the accumulator 250. The pressure in the accumulator 250 and therefore on the passage 176 will rise rapidly until the pressure in passage 176 is equal to trim pressure in passage 246. After the pressure in passage 176 is equal to trim pressure, the pressure in passage 176 will rise more slowly as the accumulator spring 260 is compressed by further increase in line pressure in passage 176. When the accumulator 250 has reached its full stroke, the pressure in passage 176 again will rise rapidly until it is equal to line pressure.

As seen in FIG. 10, the trim pressure in passage 246 is proportional to shift TV pressure, plus the value of spring 240 in the trim valve 60. The spring 240 establishes a minimum trim pressure. FIG. 11 describes the pressure rise in the intermediate servo 134 during a first to second shift. As seen the pressure on the intermediate servo initially rises until the fluid pressure in passage 176 is equal to the servo spring 282. The further increase in pressure is controlled by the trim pressure. The dashed line shows the variance between low throttle settings and high throttle settings which can be accompanied through the use of the variable trim pressure. When this point of the curve is reached, the servo 134 will have been fully stroked and the band will have been applied. Further increase in pressure is permitted by stroking of the accumulator against the spring 260 such that a slower pressure rise is obtained. The pressure in passage 176 then rises rapidly, after the accumulator 250 has stroked, to equal line pressure. Since the low ratio or first gear was established by a one way device, there is no timing problem on a one-two upshift. The transmission will simply remain in first gear until the band operated by the intermediate servo 134 is engaged sufficiently to carry the torque for second gear operation. On a 2-1 downshift it is simply a matter of exhausting fluid pressure form passage 176, which is accomplished through the 1-2 shift valve 186. As seen in FIG. 11 the pressure operating the servo 134 will originally decrease until the accumulator 250 has returned to its spring set position, and then further decrease is accomplished by the spring return of the intermediate servo 134. Again, no shift timing is required since, when the servo 134 has released the intermediate brake, the one way drive establishing device for low gear will automatically pick-up the torque reaction.

2-3 SHIFT CONTROL

Figure 12:
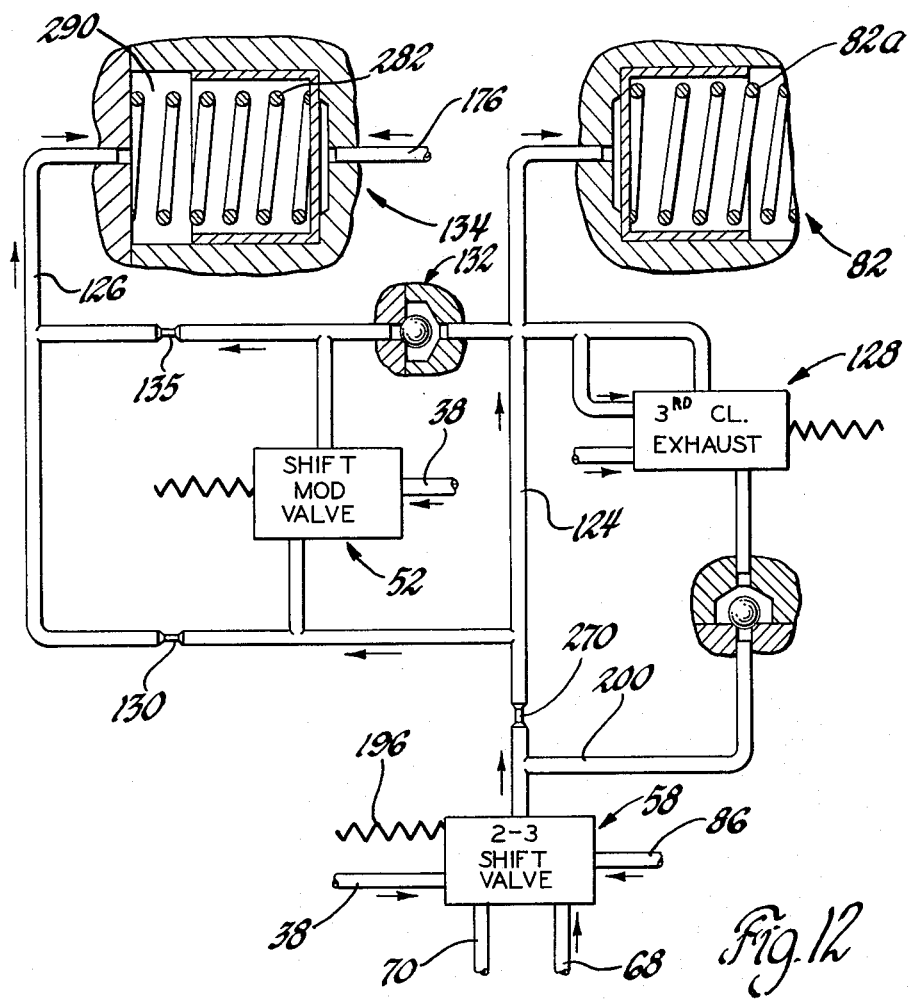
FIG. 12 is a schematic diagram of the valving associated with the 2–3 upshift system.
Figure 13:
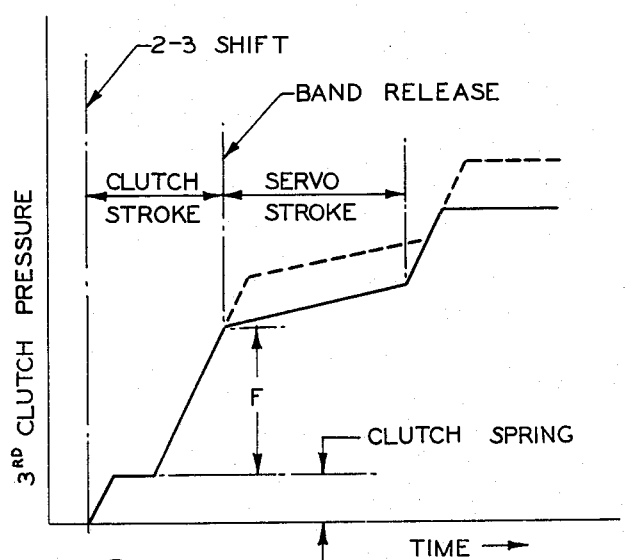
FIG. 13 is a graph showing pressure versus time relationship of the 2–3 upshift system.

The second to third upshift control system is shown in FIGS. 12 and 13. During an upshift from second to third, the shift modulator valve 52 and the third clutch exhaust valve 128 are not operational. When the bias forces on the 2-3 shift valve 58 are at the proper level for an upshift, the 2-3 shift valve 58 will move from the second ratio position to the third ratio position. On an upshift from second to third, fluid pressure in the RND passage 68 will be directed through the shift valve 58 to the third clutch feed passage 200. Fluid pressure in the third clutch feed passage 200 passes through the restriction 270 to the third clutch engage passage 124. Fluid pressure in this passage 124 is distributed to the direct clutch 82 and to the third accumulator 290, which is part of the intermediate servo 134. Fluid pressure in the third accumulator 290 and the direct clutch 82 increase at the same rate such that the third clutch 82 is engaged while the intermediate servo is disengaged by pressure in the third accumulator. This provides a "wash-out" type shift. The curve in FIG. 13 shows the third clutch pressure versus time for an upshift from second to third. The initial rise in pressure in the third clutch is created by the clutch spring 82a. This is followed by a rise in pressure which accompanies the stroke of the clutch piston, and the release of the intermediate servo 134, which is accomplished on the second to third upshift. Fluid pressure increases less rapidly while the servo 134 is being stroked by the fluid pressure in the accumulator 290. When the servo 134 has been fully stroked, the third clutch pressure and accumulator pressure will rise rapidly to equal line pressure. The dashed lines indicate the maximum clutch pressure that can be obtained when maximum shift TV pressure is available.

3-2 SHIFT CONTROL

Figure 14:
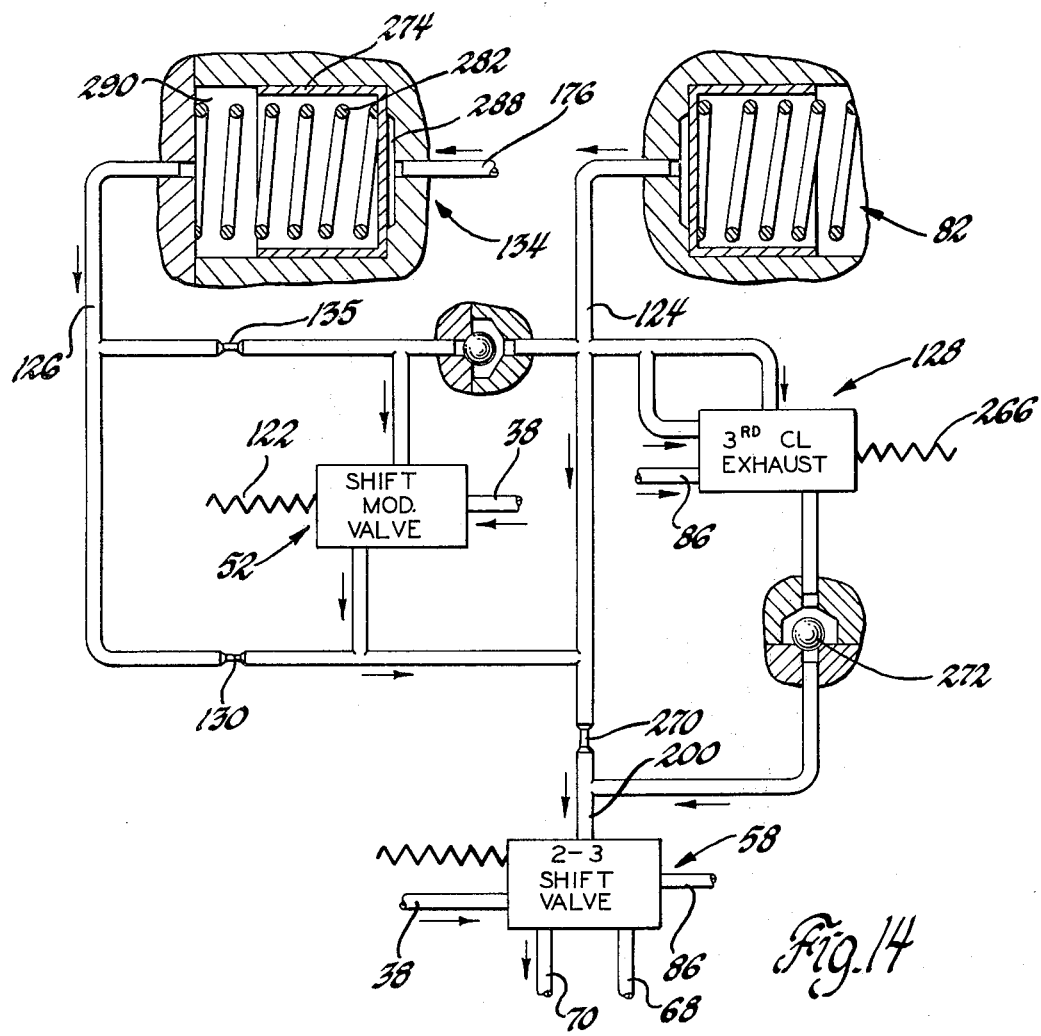
FIG. 14 is a schematic diagram of the valving associated with the 3–2 downshift system.
Figure 15:
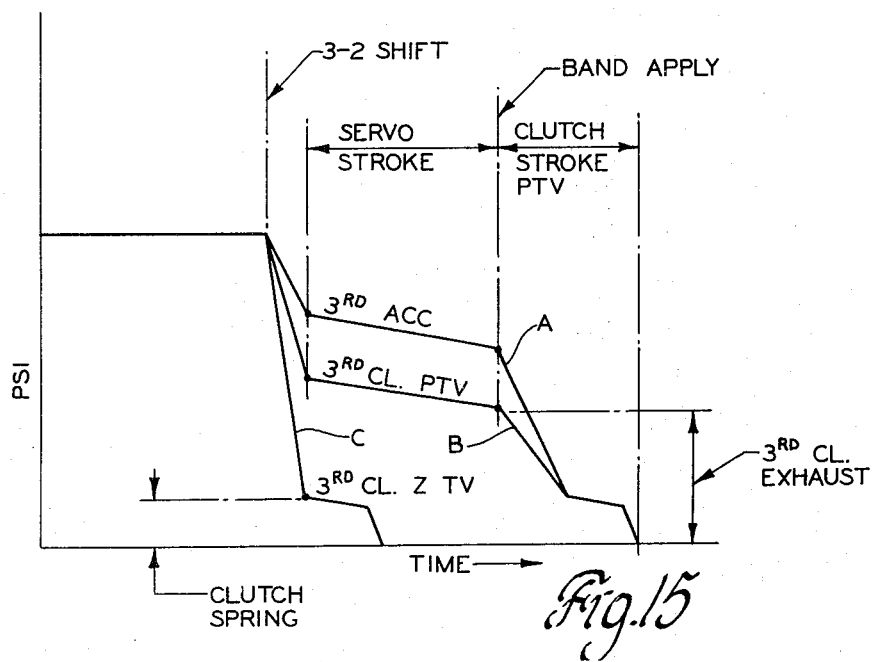
FIG. 15 is a graph showing the pressure versus time relationship of the 3–2 downshift system.

The third gear to second gear downshift system is shown in FIGS. 14 and 15. A 3-2 downshift can occur under three different conditions. First, a detent downshift which is a forced downshift from third to second, secondly a part throttle downshift, which can also be considered a force type downshift, or thirdly a coasting downshift at substantially closed throttle conditions. During a detent or part throttle downshift, the shift modulator valve 52 will have been positioned by shift TV pressure in passage 38 such that the third accumulator passage 126 will be open to the third clutch passage 124 between lands $a$ and $b$ of valve spool 118. Thus, the third accumulator will be exhausted through the relatively large restriction 135. When such a downshift occurs, the third clutch 82 and the third accumulator 290 will be exhausted at substantially equal rates which permits the intermediate servo to be engaged almost instantaneously or permits a slight overlap with the disengagement of the third clutch 82. This is seen by viewing curves A and B of FIG. 15. As will be noted there, initially the third accumulator and third clutch pressure decrease at almost an equal rate to the point where the servo has been stroked such that the intermediate band is applied while the direct clutch 82 is still substantially engaged. The initial decrease in pressure in the third accumulator is controlled by the excess fluid pressure being exhausted until the forces acting on the piston 274 of the intermediate servo are substantially equal. That is, the fluid pressure in chamber 288 must be greater than the fluid pressure in chamber 290 since the areas are not equal. At this time the balancing force on the intermediate servo will be the spring 282. Further decrease in the third accumulator pressure will be accompanied by the stroking of the intermediate servo while the band 324 is being applied. Since the fluid in the accumulator and the third clutch must be exhausted through substantially the same passages, the pressures will decrease somewhat simultaneously. When the intermediate servo has been fully stroked, less accumulator oil is available for exhaust and therefore a more rapid decrease in third clutch pressure will occur until the spring force in the third clutch is balanced by third clutch pressure at which time the remaining fluid in the third clutch system is exhausted by the stroking of the clutch piston.

At closed throttle 3–2 downshifts, it is more desirable to disengage the third or direct clutch 82 prior to the engagement of the intermediate servo. This downshift arrangement, with no overlap, provides a smoother downshift, since during this condition the engine must be accelerated by the vehicle when the intermediate ratio is engaged if an overlap exists. As is seen in FIG. 15 curve c, the third clutch 82 is almost immediately exhausted of pressure to the level balancing the third clutch spring. The third clutch pressure then decreases less rapidly until the clutch is fully exhausted. However, at this time, the third accumulator 290 is still exhausted substantially in accordance with curve A of FIG. 15. This is accomplished by the shift modulator valve 52 being moved to the spring set position shown and described above. When the shift modulator valve 52 is in the spring set position, the third accumulator passage 126 is exhausted through the relatively small restriction 130. Therefore the third accumulator oil is not exhausted rapidly enough to maintain fluid pressure downstream between the restriction 130 and the third clutch engage passage 124. This permits the third clutch to exhaust more rapidly through the restriction 270, or through the clutch exhaust valve 128 assuming the vehicle speed is sufficiently high to maintain the third clutch exhaust valve 128 open during a particular coasting downshift condition.

The third clutch exhaust valve 128 permits the variety of downshifting conditions to occur. At high speed detent or part throttle downshifts the third clutch exhaust valve 128 is opened by governor pressure in passage 86 to permit relatively free exhaust of the third clutch engage passage 124, hence the ball valve 272 allows the fluid to bypass the restriction 270, thus providing a free exhaust passage for the third clutch and third accumulator. This is desirable at high vehicle speeds, since under these conditions a firm shift is provided by rapidly interchanging the intermediate servo and the direct clutch.

LOW-REVERSE BRAKE CONTROL

Figure 16:
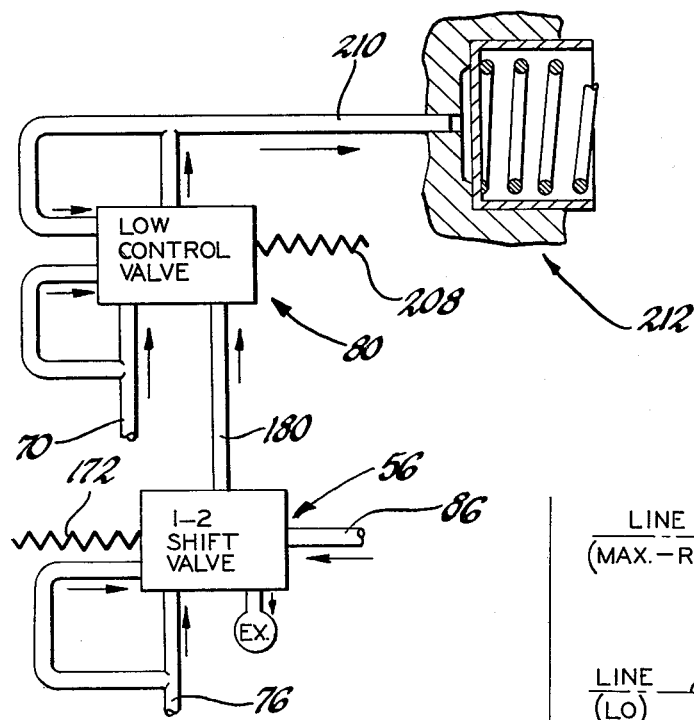
FIG. 16 is a schematic diagram of the valving associated with the low-reverse control.
Figure 17:
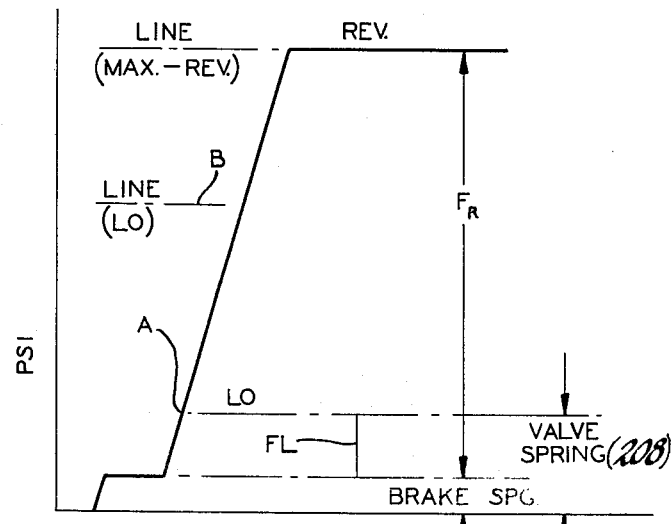
FIG. 17 is a graph depicting the pressure versus time relationship established by the valving in FIG. 16.

The low and reverse brake control is described in FIGS. 16 and 17. As seen in FIG. 16, when the manual valve 20 is positioned for reverse, line pressure is directed through the reverse passage 70 to the low control valve 80. The low control valve 80 functions such that fluid pressure in reverse passage 70 fully opens the valve 80 to provide direct fluid communication between passage 70 and the low-reverse engage passage 210. Thus, in reverse drive the brake 212 is engaged with full reverse line pressure. This pressure as described previously varies from a minimum value to a maximum value depending upon throttle position.

Since a single area brake piston is used, and a lower engagement pressure is necessary in low than in reverse, the engage pressure in the low-reverse engage passage 210 must be reduced for low gear operation.

In manual low operation, as determined by the manual valve 20, line pressure is directed through the low passage 76 to the 1–2 shift valve 56. Line pressure on the 1–2 shift valve 56 creates a bias on the valve spool 166 to retard upshifting of this valve due to governor pressure and also directs fluid pressure to the low feed passage 180. Fluid pressure in the low feed passage 180 is communicated to the low control valve 80. The low control valve 80 directs fluid pressure from the low feed passage 180 to the low-reverse engage passage 210. This fluid pressure is also directed to a differential area on the valve spool 204 of the low control valve 80 such that the valve spool disconnects fluid communication between the low feed passage 180 and the low-reverse engage passage 210 at a predetermined pressure level. This pressure level is determined by the force necessary to maintain the brake 212 engaged during low gear operation. Thus, depending on the particular gear set chosen, the reaction taken during low gear may be higher or lower in some gear sets than others and in most instances lower than the reverse engagement pressure required. Pressure control for low gear accomplished by controlling the value of the bias spring 208 and the size of the differential area between lands b and c on the valve spool 204. This permits a wide range of low engagement pressures so that the control can be tailored for a variety of gearing arrangements.

The curve shown in FIG. 17 describes the engagement pressure used for the brake 212. As seen in FIG. 17, the pressure in the low reverse engage passage 210 will initially increase to a value equal to the spring which maintains the brake 212 in the disengaged position. When the pressure has been increased sufficiently to overcome the return spring, the pressure on the system will rise, in the reverse drive operation, to reverse line pressure which will fully engage the brake for reverse operation. In low gear operation, however, it is seen that the pressure in the low-reverse engage passage 210 will increase only to point A, after which further increase in pressure is not permitted by the low control valve 80. Also, as is seen in FIG. 17, curve D shows the line pressure which is available in low gear operation. As was noted earlier the line pressure in low gear is maintained at a constant by the intermediate-low boost valve 50 which directs the boost pressure to the regulator valves 18 during low and intermediate operation.

Obviously, many modifications and variations of the present invention are possible in light of the above teachings. It is, therefore, to be understood that within the scope of the appended claims the invention may be practiced otherwise than as specifically described.

What is claimed is:

1. A hydraulic control for a throttle controlled engine driven transmission having a fluid operated drive establishing device which is selectively engageable for two distinct drive ratios at different engagement pressures, said control comprising; a source of fluid pressure; control valve means for controlling the engagement of said drive establishing means including a valve bore, a valve spool slidably disposed in said bore, first pressure responsive area means formed by said bore and spool, second pressure responsive area means formed by said bore and spool, passage means interconnecting said second pressure responsive area means and said drive establishing means; and manual valve means for selecting said drive ratios and including a movable member, first control passage means in fluid communication with said first pressure responsive area means for directing fluid pressure from said source to said first pressure responsive area means when one of said drive ratios is selected to move said valve spool to provide fluid communication between said first pressure responsive area means and said passage means to pressurize both pressure responsive areas to engage said drive establishing device with full source pressure, and second control passage means for directing fluid pressure from said source to said passage means when the other of said drive ratios is selected and the pressure in said passage means acting on said second pressure responsive area means to move said valve spool to discontinue fluid communication between said second control passage means and said passage means at a predetermined pressure level, less than source pressure, to engage said drive establishing device at the predetermined pressure level.

* * * * *

UNITED STATES PATENT AND TRADEMARK OFFICE
CERTIFICATE OF CORRECTION

PATENT NO. : 3,896,685
DATED : July 29, 1975
INVENTOR(S) : Carl E. Shellman

It is certified that error appears in the above–identified patent and that said Letters Patent are hereby corrected as shown below:

Column 3, line 55, the numeral "85" should read -- 86 --.

Column 6, line 39, the numeral "85" should read -- 84 --.

Column 12, line 45, "164 at a positioin" should read -- 264 at a position --.

Column 15, line 36, "pressure valve." should read -- pressure value. --.

Column 16, line 58, the numeral "142" should read -- 152 --.

Signed and Sealed this ninth Day of December 1975

[SEAL]

Attest:

RUTH C. MASON
Attesting Officer

C. MARSHALL DANN
Commissioner of Patents and Trademarks